(12) United States Patent
Misra et al.

(10) Patent No.: US 12,079,822 B2
(45) Date of Patent: Sep. 3, 2024

(54) SYSTEM, METHOD, AND COMPUTER PROGRAM PRODUCT FOR FALSE DECLINE MITIGATION

(71) Applicant: Visa International Service Association, San Francisco, CA (US)

(72) Inventors: Navendu Misra, Austin, TX (US); Durga Kala, Cupertino, CA (US); Nipun Agarwal, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 676 days.

(21) Appl. No.: 16/361,724

(22) Filed: Mar. 22, 2019

(65) Prior Publication Data

US 2020/0302450 A1 Sep. 24, 2020

(51) Int. Cl.
*G06Q 20/40* (2012.01)
*G06N 3/08* (2023.01)
*G06N 7/01* (2023.01)
*G06Q 30/018* (2023.01)

(52) U.S. Cl.
CPC ........... *G06Q 30/0185* (2013.01); *G06N 3/08* (2013.01); *G06N 7/01* (2023.01); *G06Q 20/40* (2013.01)

(58) Field of Classification Search
CPC .................................................... G06Q 20/40
USPC ................................................ 705/64, 14.64
See application file for complete search history.

(56) References Cited

U.S. PATENT DOCUMENTS

| | | | | |
|---|---|---|---|---|
| 8,924,279 B2 * | 12/2014 | Liu | ..................... | G06Q 20/4016 705/37 |
| 9,589,266 B2 * | 3/2017 | Pourfallah | ............. | G06Q 20/36 |
| 9,842,336 B2 | 12/2017 | Liu et al. | | |
| 2003/0233292 A1 * | 12/2003 | Richey | ................... | G06Q 40/12 705/28 |
| 2011/0066493 A1 * | 3/2011 | Faith | .................. | G06Q 30/0251 705/14.49 |

(Continued)

OTHER PUBLICATIONS

Marr, Bernard, The Amazing Ways How Mastercard Uses Artificial Intelligence To Stop Fraud and Reduce False Declines, Forbes, dated Nov. 30, 2018, downloaded from https://www.forbes.com/ on Nov. 9, 2021 (Year: 2018).*

(Continued)

*Primary Examiner* — Scott D Gartland
(74) *Attorney, Agent, or Firm* — The Webb Law Firm

(57) ABSTRACT

A method, system, and computer program product for false decline mitigation. The method includes obtaining an objective function associated with an issuer system; training a neural network, based on prior transaction data associated with one or more prior transactions, to optimize the objective function; providing the trained neural network; receiving transaction data generated, based on one or more case creation (CC) rules, during processing of a transaction associated with an account identifier; processing, using the trained neural network, the transaction data to generate an exclude account list including the account identifier; receiving subsequent transaction data associated with a subsequent transaction associated with the account identifier; and authorizing, based on the exclude account list and the account identifier, the subsequent transaction associated with the account identifier without applying one or more real-time decisioning (RTD) rules to the subsequent transaction.

16 Claims, 7 Drawing Sheets

(56) References Cited

U.S. PATENT DOCUMENTS

| | | | |
|---|---|---|---|
| 2014/0108251 A1* | 4/2014 | Anderson | G06Q 20/4016 |
| | | | 705/44 |
| 2015/0227935 A1* | 8/2015 | Adjaoute | G06F 21/60 |
| | | | 705/44 |
| 2016/0063502 A1* | 3/2016 | Adjaoute | G06N 20/00 |
| | | | 705/44 |
| 2018/0101852 A1 | 4/2018 | Liu et al. | |
| 2018/0150843 A1* | 5/2018 | Adjaoute | G06N 5/04 |
| 2018/0211233 A1* | 7/2018 | Gupta | G06Q 20/381 |

OTHER PUBLICATIONS

Logic Definition, Merriam-Webster [online], downloaded May 22, 2023 from https://www.merriam-webster.com/dictionary/logic (Year: 2023).*

* cited by examiner

| Node | Content |
|---|---|
| ?xml | version="1.0" |
| ▼ RTDRuleFile | |
| ▶ batchTransferControlData | |
| ▼ RTDRule | |
|   rtdRuleID | 60538881 |
| ▼ rtdCriteria | |
|   criteriaID | 131487 |
|   criteriaOrGroupID | 0 |
|   fieldName | panFirstDigits |
|   operation | BETWEEN |
|   fieldValue | 433430000 |
|   fieldValue | 433439999 |
| ▼ rtdCriteria | |
|   criteriaID | 131489 |
|   criteriaOrGroupID | 0 |
|   fieldName | digCommInd |
|   operation | NOTIN |
|   fieldValue | 1 |
| ▼ rtdAction | |
|   rtdActionCode | Decline |
|   additionalRuleAction | 0000000000000000 |

SYSTEM, METHOD, AND COMPUTER PROGRAM PRODUCT FOR FALSE DECLINE MITIGATION

BACKGROUND

1. Field

This disclosure relates generally to systems, devices, products, apparatuses, and methods that are used for false decline mitigation in transaction processing, and in some particular embodiments or aspects, to a system, a product, and a method for real-time false decline mitigation using alert processing.

2. Technical Considerations

Transaction fraud is on the rise in the payment industry. Issuers suffer losses in millions of dollars each year due to transaction fraud. Effective rules and quick enablement of fraud prevention rules in a transaction processing network can save millions of dollars in fraud losses for issuers and merchants. For example, fraud prevention tools detect fraudulent transactions using fraud prevention rules and decline a portion of transactions as fraudulent. However, not every declined transaction is actually a fraudulent transaction. For example, a significant number of the portion of transactions declined as fraudulent may actually be otherwise good transactions, which are known as false positives or false declines. Accordingly, there is a need for improved false decline mitigation in the payment industry.

SUMMARY

Accordingly, provided are improved systems, devices, products, apparatuses, and/or methods for false decline mitigation.

According to some non-limiting embodiments or aspects, provided is a computer-implemented method for false decline mitigation, including: obtaining, with at least one processor, an objective function associated with an issuer system; training, with at least one processor, a neural network, based on prior transaction data associated with one or more prior transactions, to optimize the objective function; providing, with at least one processor, the trained neural network; receiving, with at least one processor, transaction data generated, based on one or more case creation (CC) rules, during processing of a transaction associated with an account identifier; processing, with at least one processor, using the trained neural network, the transaction data to generate an exclude account list including the account identifier; receiving, with at least one processor, subsequent transaction data associated with a subsequent transaction associated with the account identifier; and authorizing, with at least one processor, based on the exclude account list and the account identifier, the subsequent transaction for the account identifier without applying one or more real-time decisioning (RTD) rules to the subsequent transaction.

In some non-limiting embodiments or aspects, training the neural network to optimize the objective function further includes: determining, with the neural network, one or more probabilities of the one or more prior transactions being falsely declined by the one or more RTD rules, the objective function depending on the one or more probabilities; and modifying, using the objective function, one or more parameters of the neural network.

In some non-limiting embodiments or aspects, the objective function further depends on one or more amounts of the one or more transactions.

In some non-limiting embodiments or aspects, the method further includes: providing, with at least one processor, an issuer interface to the issuer system; receiving, with at least one processor, via the issuer interface from the issuer system, issuer input; and determining, with at least one processor, the objective function based on the issuer input.

In some non-limiting embodiments or aspects, the method further includes: providing, with at least one processor, via the issuer interface to the issuer system, design feedback data associated with at least one of a number of false declined transactions and a number of true decline transactions for the issuer system.

In some non-limiting embodiments or aspects, receiving the transaction data generated based on the one or more CC rules further includes: receiving fraud data associated with the transaction; and determining that the transaction associated with the account identifier is associated with a false decline based on the fraud data, the transaction data being generated based on the one or more CC rules is generated and received before the transaction associated with the account identifier is determined to be associated with a false decline.

In some non-limiting embodiments or aspects, the subsequent transaction associated with the account identifier is authorized, based on the exclude account list and the account identifier, without applying the one or more RTD rules to the subsequent transaction, before receiving the fraud data associated with the transaction.

According to some non-limiting embodiments or aspects, provided is a computing system for false decline mitigation, including: one or more processors programmed and/or configured to: obtain an objective function associated with an issuer system; train a neural network, based on prior transaction data associated with one or more prior transactions, to optimize the objective function; provide the trained neural network; receive transaction data generated, based on one or more case creation (CC) rules, during processing of a transaction associated with an account identifier; process, using the trained neural network, the transaction data to generate an exclude account list including the account identifier; receive subsequent transaction data associated with a subsequent transaction for the account identifier; and authorize, based on the exclude account list and the account identifier, the subsequent transaction for the account identifier without applying one or more real-time decisioning (RTD) rules to the subsequent transaction.

In some non-limiting embodiments or aspects, the one or more processors train the neural network to optimize the objective function by: determining, with the neural network, one or more probabilities of the one or more prior transactions being falsely declined by the one or more RTD rules, the objective function depending on the one or more probabilities; and modifying, using the objective function, one or more parameters of the neural network.

In some non-limiting embodiments or aspects, the objective function further depends on one or more amounts of the one or more transactions.

In some non-limiting embodiments or aspects, the one or more processors are further programmed and/or configured to: provide an issuer interface to the issuer system; receive, via the issuer interface from the issuer system, issuer input; and determine the objective function based on the issuer input.

In some non-limiting embodiments or aspects, the one or more processors are further programmed and/or configured to: provide, via the issuer interface to the issuer system, design feedback data associated with at least one of a number of false declined transactions and a number of true decline transactions for the issuer system.

In some non-limiting embodiments or aspects, the one or more processors receive the transaction data generated based on the one or more CC rules by: receiving fraud data associated with the transaction; and determining that the transaction associated with the account identifier is associated with a false decline based on the fraud data, the transaction data being generated based on the one or more CC rules is generated and received before the transaction associated with the account identifier is determined to be associated with a false decline.

In some non-limiting embodiments or aspects, the subsequent transaction associated with the account identifier is authorized, based on the exclude account list and the account identifier, without applying the one or more RTD rules to the subsequent transaction, before receiving the fraud data associated with the transaction.

According to some non-limiting embodiments or aspects, provided is a computer program product including at least one non-transitory computer-readable medium including program instructions for false decline mitigation that, when executed by at least one processor, cause the at least one processor to: obtain an objective function associated with an issuer system; train a neural network, based on prior transaction data associated with one or more prior transactions, to optimize the objective function; provide the trained neural network; receive transaction data generated, based on one or more case creation (CC) rules, during processing of a transaction associated with an account identifier; process, using the trained neural network, the transaction data to generate an exclude account list including the account identifier; receive subsequent transaction data associated with a subsequent transaction for the account identifier; and authorize, based on the exclude account list and the account identifier, the subsequent transaction for the account identifier without applying one or more real-time decisioning (RTD) rules to the subsequent transaction.

In some non-limiting embodiments or aspects, the instructions further cause the at least one processor to train the neural network to optimize the objective function by: determining, with the neural network, one or more probabilities of the one or more prior transactions being falsely declined by the one or more RTD rules, the objective function depending on the one or more probabilities; and modifying, using the objective function, one or more parameters of the neural network.

In some non-limiting embodiments or aspects, the objective function further depends on one or more amounts of the one or more transactions.

In some non-limiting embodiments or aspects, the instructions further cause the at least one processor to: provide an issuer interface to the issuer system; receive, via the issuer interface from the issuer system, issuer input; and determine the objective function based on the issuer input.

In some non-limiting embodiments or aspects, the instructions further cause the at least one processor to: provide, via the issuer interface to the issuer system, design feedback data associated with at least one of a number of false declined transactions and a number of true decline transactions for the issuer system.

In some non-limiting embodiments or aspects, the instructions further cause the at least one processor to: receive the transaction data generated based on the one or more CC rules by: receiving fraud data associated with the transaction; and determining that the transaction associated with the account identifier is associated with a false decline based on the fraud data, the transaction data being generated based on the one or more CC rules is generated and received before the transaction associated with the account identifier is determined to be associated with a false decline, and the subsequent transaction associated with the account identifier being authorized, based on the exclude account list and the account identifier, without applying the one or more RTD rules to the subsequent transaction, before receiving the fraud data associated with the transaction.

According to some non-limiting embodiments or aspects, provided is a computer-implemented method for false decline mitigation, including: declining, with at least one processor, a transaction by applying one or more RTD rules to transaction data associated with the transaction, the transaction data including an account identifier associated with the transaction; receiving, with at least one processor, alert data associated with the transaction from an issuer system; processing, with at least one processor, using a neural network model associated with the issuer system, the alert data to generate an exclude account list including the account identifier, the exclude account list being associated with the issuer system; receiving, with at least one processor, subsequent transaction data associated with a subsequent transaction associated with the account identifier; and authorizing, with at least one processor, based on the exclude account list and the account identifier, the subsequent transaction for the account identifier.

According to some non-limiting embodiments or aspects, provided is a computing system for false decline mitigation including one or more processors programmed and/or configured to: decline a transaction by applying one or more RTD rules to transaction data associated with the transaction, the transaction data including an account identifier associated with the transaction; receive alert data associated with the transaction from an issuer system; process, using a neural network model associated with the issuer system, the alert data to generate an exclude account list including the account identifier, the exclude account list being associated with the issuer system; receive subsequent transaction data associated with a subsequent transaction associated with the account identifier; and authorize, based on the exclude account list and the account identifier, the subsequent transaction for the account identifier.

According to some non-limiting embodiments or aspects, provided is a computer program product including at least one non-transitory computer-readable medium including program instructions for false decline mitigation that, when executed by at least one processor, cause the at least one processor to: decline a transaction by applying one or more RTD rules to transaction data associated with the transaction, the transaction data including an account identifier associated with the transaction; receive alert data associated with the transaction from an issuer system; process, using a neural network model associated with the issuer system, the alert data to generate an exclude account list including the account identifier, the exclude account list being associated with the issuer system; receive subsequent transaction data associated with a subsequent transaction associated with the account identifier; and authorize, based on the exclude account list and the account identifier, the subsequent transaction for the account identifier.

Further embodiments or aspects are set forth in the following numbered clauses:

Clause 1: A computer-implemented method for false decline mitigation, comprising: obtaining, with at least one processor, an objective function associated with an issuer system; training, with at least one processor, a neural network, based on prior transaction data associated with one or more prior transactions, to optimize the objective function; providing, with at least one processor, the trained neural network; receiving, with at least one processor, transaction data generated, based on one or more case creation (CC) rules, during processing of a transaction associated with an account identifier; processing, with at least one processor, using the trained neural network, the transaction data to generate an exclude account list including the account identifier; receiving, with at least one processor, subsequent transaction data associated with a subsequent transaction associated with the account identifier; and authorizing, with at least one processor, based on the exclude account list and the account identifier, the subsequent transaction for the account identifier without applying one or more real-time decisioning (RTD) rules to the subsequent transaction.

Clause 2: The computer-implemented method of clause 1, wherein training the neural network to optimize the objective function further comprises: determining, with the neural network, one or more probabilities of the one or more prior transactions being falsely declined by the one or more RTD rules, wherein the objective function depends on the one or more probabilities; and modifying, using the objective function, one or more parameters of the neural network.

Clause 3: The computer-implemented method of clauses 1 or 2, wherein the objective function further depends on one or more amounts of the one or more transactions.

Clause 4: The computer-implemented method of any of clauses 1-3, further comprising: providing, with at least one processor, an issuer interface to the issuer system; receiving, with at least one processor, via the issuer interface from the issuer system, issuer input; and determining, with at least one processor, the objective function based on the issuer input.

Clause 5: The computer-implemented method of any of clauses 1-4, further comprising: providing, with at least one processor, via the issuer interface to the issuer system, design feedback data associated with at least one of a number of false declined transactions and a number of true decline transactions for the issuer system.

Clause 6: The computer-implemented method of any of clauses 1-5, wherein receiving the transaction data generated based on the one or more CC rules further comprises: receiving fraud data associated with the transaction; and determining that the transaction associated with the account identifier is associated with a false decline based on the fraud data, wherein the transaction data generated based on the one or more CC rules is generated and received before the transaction associated with the account identifier is determined to be associated with a false decline.

Clause 7: The computer-implemented method of any of clauses 1-6, the subsequent transaction associated with the account identifier is authorized, based on the exclude account list and the account identifier, without applying the one or more RTD rules to the subsequent transaction, before receiving the fraud data associated with the transaction.

Clause 8: A computing system for false decline mitigation, comprising: one or more processors programmed and/or configured to: obtain an objective function associated with an issuer system; train a neural network, based on prior transaction data associated with one or more prior transactions, to optimize the objective function; provide the trained neural network; receive transaction data generated, based on one or more case creation (CC) rules, during processing of a transaction associated with an account identifier; process, using the trained neural network, the transaction data to generate an exclude account list including the account identifier; receive subsequent transaction data associated with a subsequent transaction for the account identifier; and authorize, based on the exclude account list and the account identifier, the subsequent transaction for the account identifier without applying one or more real-time decisioning (RTD) rules to the subsequent transaction.

Clause 9: The computing system of clause 8, wherein the one or more processors train the neural network to optimize the objective function by: determining, with the neural network, one or more probabilities of the one or more prior transactions being falsely declined by the one or more RTD rules, wherein the objective function depends on the one or more probabilities; and modifying, using the objective function, one or more parameters of the neural network.

Clause 10: The computing system of clauses 8 or 9, wherein the objective function further depends on one or more amounts of the one or more transactions.

Clause 11: The computing system of any of clauses 8-10, wherein the one or more processors are further programmed and/or configured to: provide an issuer interface to the issuer system; receive, via the issuer interface from the issuer system, issuer input; and determine the objective function based on the issuer input.

Clause 12: The computing system of any of clauses 8-11, wherein the one or more processors are further programmed and/or configured to: provide, via the issuer interface to the issuer system, design feedback data associated with at least one of a number of false declined transactions and a number of true decline transactions for the issuer system.

Clause 13: The computing system of any of clauses 8-12, wherein the one or more processors receive the transaction data generated based on the one or more CC rules by: receiving fraud data associated with the transaction; and determining that the transaction associated with the account identifier is associated with a false decline based on the fraud data, wherein the transaction data generated based on the one or more CC rules is generated and received before the transaction associated with the account identifier is determined to be associated with a false decline.

Clause 14: The computing system of any of clauses 8-13, wherein the subsequent transaction associated with the account identifier is authorized, based on the exclude account list and the account identifier, without applying the one or more RTD rules to the subsequent transaction, before receiving the fraud data associated with the transaction.

Clause 15: A computer program product comprising at least one non-transitory computer-readable medium including program instructions for false decline mitigation that, when executed by at least one processor, cause the at least one processor to: obtain an objective function associated with an issuer system; train a neural network, based on prior transaction data associated with one or more prior transactions, to optimize the objective function; provide the trained neural network; receive transaction data generated, based on one or more case creation (CC) rules, during processing of a transaction associated with an account identifier; process, using the trained neural network, the transaction data to generate an exclude account list including the account identifier; receive subsequent transaction data associated with a subsequent transaction for the account identifier; and authorize, based on the exclude account list and the account identifier, the subsequent transaction for the account identifier without applying one or more real-time decisioning (RTD) rules to the subsequent transaction.

Clause 16: The computer program product of clause 15, wherein the instructions further cause the at least one processor to train the neural network to optimize the objective function by: determining, with the neural network, one or more probabilities of the one or more prior transactions being falsely declined by the one or more RTD rules, wherein the objective function depends on the one or more probabilities; and modifying, using the objective function, one or more parameters of the neural network.

Clause 17: The computer program product of clauses 15 or 16, wherein the objective function further depends on one or more amounts of the one or more transactions.

Clause 18: The computer program product of any of clauses 15-17, wherein the instructions further cause the at least one processor to: provide an issuer interface to the issuer system; receive, via the issuer interface from the issuer system, issuer input; and determine the objective function based on the issuer input.

Clause 19: The computer program product of any of clauses 15-18, wherein the instructions further cause the at least one processor to: provide, via the issuer interface to the issuer system, design feedback data associated with at least one of a number of false declined transactions and a number of true decline transactions for the issuer system.

Clause 20: The computer program product of any of clauses 15-19, wherein the instructions further cause the at least one processor to: receive the transaction data generated based on the one or more CC rules by: receiving fraud data associated with the transaction; and determining that the transaction associated with the account identifier is associated with a false decline based on the fraud data, wherein the transaction data generated based on the one or more CC rules is generated and received before the transaction associated with the account identifier is determined to be associated with a false decline, and wherein the subsequent transaction associated with the account identifier is authorized, based on the exclude account list and the account identifier, without applying the one or more RTD rules to the subsequent transaction, before receiving the fraud data associated with the transaction.

Clause 21: A computer-implemented method for false decline mitigation, comprising: declining, with at least one processor, a transaction by applying one or more RTD rules to transaction data associated with the transaction, wherein the transaction data includes an account identifier associated with the transaction; receiving, with at least one processor, alert data associated with the transaction from an issuer system; processing, with at least one processor, using a neural network model associated with the issuer system, the alert data to generate an exclude account list including the account identifier, wherein the exclude account list is associated with the issuer system; receiving, with at least one processor, subsequent transaction data associated with a subsequent transaction associated with the account identifier; and authorizing, with at least one processor, based on the exclude account list and the account identifier, the subsequent transaction for the account identifier.

Clause 22: A computing system for false decline mitigation comprising one or more processors programmed and/or configured to: decline a transaction by applying one or more RTD rules to transaction data associated with the transaction, wherein the transaction data includes an account identifier associated with the transaction; receive alert data associated with the transaction from an issuer system; process, using a neural network model associated with the issuer system, the alert data to generate an exclude account list including the account identifier, wherein the exclude account list is associated with the issuer system; receive subsequent transaction data associated with a subsequent transaction associated with the account identifier; and authorize, based on the exclude account list and the account identifier, the subsequent transaction for the account identifier.

Clause 23: A computer program product including at least one non-transitory computer-readable medium comprising program instructions for false decline mitigation that, when executed by at least one processor, cause the at least one processor to: decline a transaction by applying one or more RTD rules to transaction data associated with the transaction, wherein the transaction data includes an account identifier associated with the transaction; receive alert data associated with the transaction from an issuer system; process, using a neural network model associated with the issuer system, the alert data to generate an exclude account list including the account identifier, wherein the exclude account list is associated with the issuer system; receive subsequent transaction data associated with a subsequent transaction associated with the account identifier; and authorize, based on the exclude account list and the account identifier, the subsequent transaction for the account identifier.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments or aspects that are illustrated in the accompanying schematic figures, in which:

FIG. 6 is a diagram of non-limiting embodiments or aspects of an implementation of a real-time decisioning (RTD) rule.

DESCRIPTION

Figure 1:
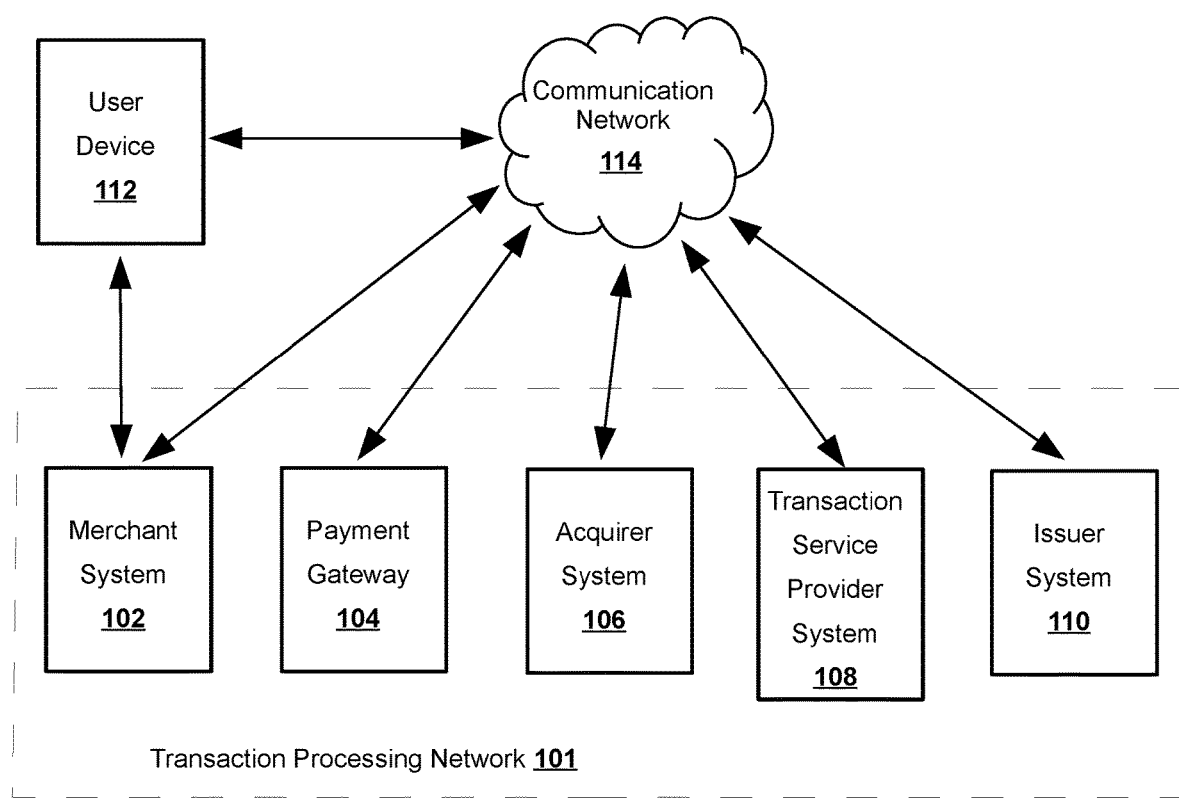
FIG. 1 is a diagram of non-limiting embodiments or aspects of an environment in which systems, devices, products, apparatuses, and/or methods, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the term "transaction service provider" may refer to an entity that receives transaction authorization requests from merchants or other entities and provides guarantees of payment, in some cases through an agreement between the transaction service provider and an issuer institution. The terms "transaction service provider" and "transaction service provider system" may also refer to one or more computer systems operated by or on behalf of a transaction service provider, such as a transaction processing system executing one or more software applications. A transaction processing system may include one or more server computers with one or more processors and, in some non-limiting embodiments or aspects, may be operated by or on behalf of a transaction service provider.

As used herein, the term "account identifier" may include one or more Primary Account Numbers (PAN), tokens, or other identifiers (e.g., a globally unique identifier (GUID), a universally unique identifier (UUID), etc.) associated with a customer account of a user (e.g., a customer, a consumer, and/or the like). The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes.

As used herein, the terms "issuer institution," "portable financial device issuer," "issuer," or "issuer bank" may refer to one or more entities that provide one or more accounts to a user (e.g., a customer, a consumer, an entity, an organization, and/or the like) for conducting transactions (e.g., payment transactions), such as initiating credit card payment transactions and/or debit card payment transactions. For example, an issuer institution may provide an account identifier, such as a personal account number (PAN), to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "merchant" may refer to an individual or entity that provides products and/or services, or access to products and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices that are configured to directly or indirectly communicate with or over one or more networks. The computing device may be a mobile device, a desktop computer, or the like. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Wallet™, Android Pay®, Apple Pay®, Samsung Pay®, and/or other like electronic payment systems. In some non-limiting examples, an issuer bank may be an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a personal digital assistant (PDA), a security card, an access card, a wireless terminal, and/or a transponder, as examples. The portable financial device may include a volatile or a non-volatile memory to store information, such as an account identifier and/or a name of the account holder.

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a merchant's POS system.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

Provided are improved systems, devices, products, apparatuses, and/or methods for false decline mitigation.

Issuers may create custom rules that identify fraudulent or suspect transactions. For example, a real-time decisioning (RTD) rule, may be applied to a transaction in progress (e.g., during processing of the transaction in a transaction processing network, etc.), and the transaction may be authorized or denied according to a result of the application of the RTD rule to the transaction. As an example, application of an RTD rule may cause a transaction to be declined at a point-of-sale (POS). In such an example, the RTD rule may be too general (e.g., the RTD rule may be applied at a relatively high level of granularity with respect to parameters of transaction data associated with the transaction, etc.), which may cause otherwise good transactions to be declined. This is known as a false positive or a false decline. Additionally, or alternatively, a true positive or a true decline may occur when an actually fraudulent transaction is declined. Further, because RTD rules may have a relatively higher granularity and/or higher shelf life, some RTD rules may be used for years based on predefined expectations. Moreover, "automatic" generation of RTD rules may always use a human or manual element to inspect and approve the RTD rules for production, enablement, and/or publishing, because RTD rules act on a relatively wider range of transactions and, therefore, a relatively simple problem in an RTD rule can impact millions of users and/or billions of transactions.

A case creation (CC) rule may initiate an investigation of a transaction that has occurred as to whether the transaction was fraudulent. For example, a CC rule may create cases that identify transactions as suspect if the transactions satisfy conditions in the CC rule, and a corresponding issuer system (e.g., a human agent, etc.) may review the suspect transactions to determine a correct follow-up action for the transaction. As an example, application of a CC rule (e.g., by an issuer system, by a transaction service provider system, etc.) may result in a message that indicates that a transaction is suspicious and/or needs human intervention, and a human agent of the issuer system may review the suspect transactions to determine whether fraud is happening and/or whether otherwise good transactions are resulting in false declines too often.

Exclude account lists include lists of accounts for which RTD rules may not be applied to transactions for the listed accounts (e.g., transactions for accounts on an exclude account list may automatically be authorized without applying RTD rules to the transactions, etc.). For example, an exclude account list enables an issuer to "whitelist" specific accounts such that the specific accounts are not impacted by RTD rules that may cause otherwise good transactions to be false declined. As an example, modification of an exclude account list may include a separate and/or different logic than a logic for modifying RTD rules. However, existing exclude account lists may be manually updated and, therefore, cannot be updated in real-time as new transactions are processed. For example, a transaction for a particular account not currently on an exclude account list may be false declined, and the exclude account list may not be updated to include the particular account before another, subsequent transaction for the particular account is initiated and/or false declined. As an example, a human agent of an issuer may review cases created by CC rules to determine that false declines are happening and manually create the exclude account list. However, existing exclude account lists may be updated only after cases created by CC rules are resolved by an issuer. For example, information and/or data associated with an initial alert of a case creation for a transaction generated immediately after the case is created and/or before the case is resolved may not be used and/or available (e.g., to a transaction service provider system, to an issuer system, etc.) to create or update an exclude account list. Additionally, or alternatively, a customer may call a human agent of the issuer to explain one or more false declines, and the human agent may manually create an exclude account list including an account identifier associated with the customer in response to the explanation from the customer.

Existing computer systems for optimizing RTD rules cannot update the RTD rules in real-time as new and/or current transactions are processed. For example, these existing computer systems may train a model based on an objective function, model parameters, and a methodology selected by a user, validate the model, and then convert the model to the RTD rules that can be implemented in real-time for processing a transaction. However, the RTD rules themselves cannot be updated continuously and/or in real-time as new and/or current transactions are processed. For example, these existing computer systems may not use or receive alert data generated by an issuer system during processing of a transaction, other fraud data generated based on and/or by CC rules, transaction outcomes determined by an issuer associated with the CC rules, and/or the like to update the RTD rules, and/or an interpretability of the RTD rules may be required to satisfy certain thresholds or standards that inhibit or prevent automatic updating of the RTD rules in real-time. In such an example, by not using and/or communicating alert data and/or past agent actions (e.g., between a transaction service provider system and an issuer system, etc.) to improve the RTD rules so that the RTD rules may not impact a future or subsequent transaction after a previous false decline, existing computer systems may not inhibit or prevent an impending false decline of an otherwise good or non-fraudulent transaction that impacts a good or non-fraudulent customer. Accordingly, these existing computer systems cannot update card or account-level rules continuously and/or in real-time as new transactions are processed.

Further, these existing computer systems may not, in the first place, avoid processing a transaction with a rules or decisioning engine that applies RTD rules. For example, executing or applying RTD rules to each transaction is computationally expensive and uses a relatively higher granularity and/or amount of data, which inhibits or prevents automatically generating and using RTD rules for processing transactions in real-time (e.g., a typical RTD rule takes at least 10 minutes to publish, enable, and/or implement for processing transactions). As an example, it is impractical to use an RTD rule system to manage RTD rules at an account identifier level of granularity, because RTD rules are business documents that are routinely read by human agents, and lengthy rules with respect to specific accounts may render the rules too difficult for consumption and/or comprehension by human agents required to publish, enable, and/or implement the RTD rules.

Non-limiting embodiments or aspects of the present disclosure are directed to systems, methods, and computer program products for false decline mitigation that obtain an objective function associated with an issuer system; train a neural network, based on prior transaction data associated with one or more prior transactions, to optimize the objective function; provide the trained neural network; receive transaction data generated, based on one or more case creation (CC) rules, during processing of a transaction associated with an account identifier; process, using the trained neural network, the transaction data to generate an exclude account list including the account identifier; receive subsequent transaction data associated with a subsequent transaction for the account identifier; and authorize, based on the exclude account list and the account identifier, the subsequent transaction for the account identifier without applying one or more RTD rules to the transaction.

In this way, non-limiting embodiments or aspects of the present disclosure provide a neural network model that updates an exclude account list based on data associated with new and/or current transactions as the new and/or current transactions are processed (and/or as data associated therewith is received) to optimize an objective function, which may be individually selected by an issuer system. For example, the neural network model can update the exclude account list based on alert data generated by an issuer system during processing of a first transaction for a particular account before a second, subsequent transaction for that particular account can be initiated (e.g., update the exclude account list immediately after the first transaction is processed and/or an alert based on a CC rule is created therefore without having to wait for a case-creation determination or outcome that indicates whether the first transaction is actually a false decline). Accordingly, non-limiting embodiments or aspects of the present disclosure may enable: (i) issuers to generate and validate an exclude account list programmatically; (ii) continuous updating of an exclude account list in real-time as new and/or current transactions are processed (and/or as data associated therewith is received) such that an account identifier associated with a new and/or current transaction can be proactively added to the exclude account list to avoid a false decline; (iii) avoiding application of RTD rules (e.g., by entirely short-circuiting or avoiding application of a rules engine, thereby saving computing system resources and making auditing and/or tracking of exclusions of certain accounts and/or durations of the exclusions of certain accounts easier; (iv) reducing and/or minimizing issuer losses and/or merchant losses due to false declines; (v) significantly reducing a granularity and/or an amount of data to be processed for authorizing a transaction (e.g., which may enable updating an exclude account list to include an account identifier in less than 20 seconds, updating an exclude account list to include an account identifier before a subsequent transaction associated with the account identifier is initiated and/or false declined, etc.); and/or the like.

Referring now to FIG. 1, FIG. 1 is a diagram of an example environment 100 in which devices, systems, methods, and/or products described herein, may be implemented. As shown in FIG. 1, environment 100 includes transaction processing network 101, which may include merchant system 102, payment gateway 104, acquirer system 106, transaction service provider system 108, and/or issuer system 110, user device 112, and/or communication network 114. Transaction processing network 101, merchant system 102, payment gateway 104, acquirer system 106, transaction service provider system 108, issuer system 110, and/or user device 112 may interconnect (e.g., establish a connection to communicate, etc.) via wired connections, wireless connections, or a combination of wired and wireless connections.

Merchant system 102 may include one or more devices capable of receiving information and/or data from payment gateway 104, acquirer system 106, transaction service provider system 108, issuer system 110, and/or user device 112 via communication network 114 and/or communicating information and/or data to payment gateway 104, acquirer system 106, transaction service provider system 108, issuer system 110, and/or user device 112 via communication network 114. Merchant system 102 may include a device capable of receiving information and/or data from user device 112 via a communication connection (e.g., an NFC communication connection, an RFID communication connection, a Bluetooth® communication connection, etc.) with user device 112, and/or communicating information and/or data to user device 112 via the communication connection. For example, merchant system 102 may include a computing device, such as a server, a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, merchant system 102 may include a POS device and/or a POS system.

Payment gateway 104 may include one or more devices capable of receiving information and/or data from merchant system 102, acquirer system 106, transaction service provider system 108, issuer system 110, and/or user device 112 via communication network 114 and/or communicating information and/or data to merchant system 102, acquirer system 106, transaction service provider system 108, issuer system 110, and/or user device 112 via communication network 114. For example, payment gateway 104 may include a computing device, such as a server, a group of servers, and/or other like devices. In some non-limiting embodiments or aspects, payment gateway 104 is associated with a payment gateway as described herein.

Acquirer system 106 may include one or more devices capable of receiving information and/or data from merchant system 102, payment gateway 104, transaction service provider system 108, issuer system 110, and/or user device 112 via communication network 114 and/or communicating information and/or data to merchant system 102, payment gateway 104, transaction service provider system 108, issuer system 110, and/or user device 112 via communication network 114. For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information and/or data from merchant system 102, payment gateway 104, acquirer system 106, issuer system 110, and/or user device 112 via communication network 114 and/or communicating information and/or data to merchant system 102, payment gateway 104, acquirer system 106, issuer system 110, and/or user device 112 via communication network 114. For example, transaction service provider system 108 may include a computing device, such as a server (e.g., a transaction processing server, etc.), a group of servers, and/or other like devices. In some non-limiting embodiments or aspects, transaction service provider system 108 may be associated with a transaction service provider as described herein. In some non-limiting embodiments or aspects, transaction service provider 108 may include and/or access one or more one or more internal and/or external databases including transaction data.

Issuer system 110 may include one or more devices capable of receiving information and/or data from merchant system 102, payment gateway 104, acquirer system 106, transaction service provider system 108, and/or user device 112 via communication network 114 and/or communicating information and/or data to merchant system 102, payment gateway 104, acquirer system 106, transaction service provider system 108, and/or user device 112 via communication network 114. For example, issuer system 110 may include a computing device, such as a server, a group of servers, and/or other like devices. In some non-limiting embodiments or aspects, issuer system 110 may be associated with an issuer institution as described herein. For example, issuer system 110 may be associated with an issuer institution that issued a payment account or instrument (e.g., a credit account, a debit account, a credit card, a debit card, etc.) to a user (e.g., a user associated with user device 112, etc.).

In some non-limiting embodiments or aspects, transaction processing network 101 includes a plurality of systems in a communication path for processing a transaction. For example, transaction processing network 101 can include merchant system 102, payment gateway 104, acquirer system 106, transaction service provider system 108, and/or issuer system 110 in a communication path (e.g., a communication path, a communication channel, a communication network, etc.) for processing an electronic payment transaction. As an example, transaction processing network 101 can process (e.g., initiate, conduct, authorize, etc.) an electronic payment transaction via the communication path between merchant system 102, payment gateway 104, acquirer system 106, transaction service provider system 108, and/or issuer system 110.

User device 112 may include one or more devices capable of receiving information and/or data from merchant system 102, payment gateway 104, acquirer system 106, transaction service provider system 108, and/or issuer system 110 via communication network 114 and/or communicating information and/or data to merchant system 102, payment gateway 104, acquirer system 106, transaction service provider system 108, and/or issuer system 110 via communication network 114. For example, user device 112 may include a client device and/or the like. In some non-limiting embodiments or aspects, user device 112 may be capable of receiving information (e.g., from merchant system 102, etc.) via a short range wireless communication connection (e.g., an NFC communication connection, an RFID communication connection, a Bluetooth® communication connection, and/or the like), and/or communicating information (e.g., to merchant system 102, etc.) via a short range wireless communication connection. In some non-limiting embodiments or aspects, user device 112 may include an application associated with user device 112, such as an application stored on user device 112, a mobile application (e.g., a mobile device application, a native application for a mobile device, a mobile cloud application for a mobile device, an electronic wallet application, a peer-to-peer payment transfer application, and/or the like) stored and/or executed on user device 112.

Communication network 114 may include one or more wired and/or wireless networks. For example, communication network 114 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices, systems, and networks shown in FIG. 1 are provided as an example. There may be additional devices, systems, and/or networks, fewer devices, systems, and/or networks, different devices, systems, and/or networks, or differently arranged devices, systems, and/or networks than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. Additionally, or alternatively, a set of devices and/or systems (e.g., one or more devices or systems) of environment 100 may perform one or more functions described as being performed by another set of devices or systems of environment 100.

Figure 2:
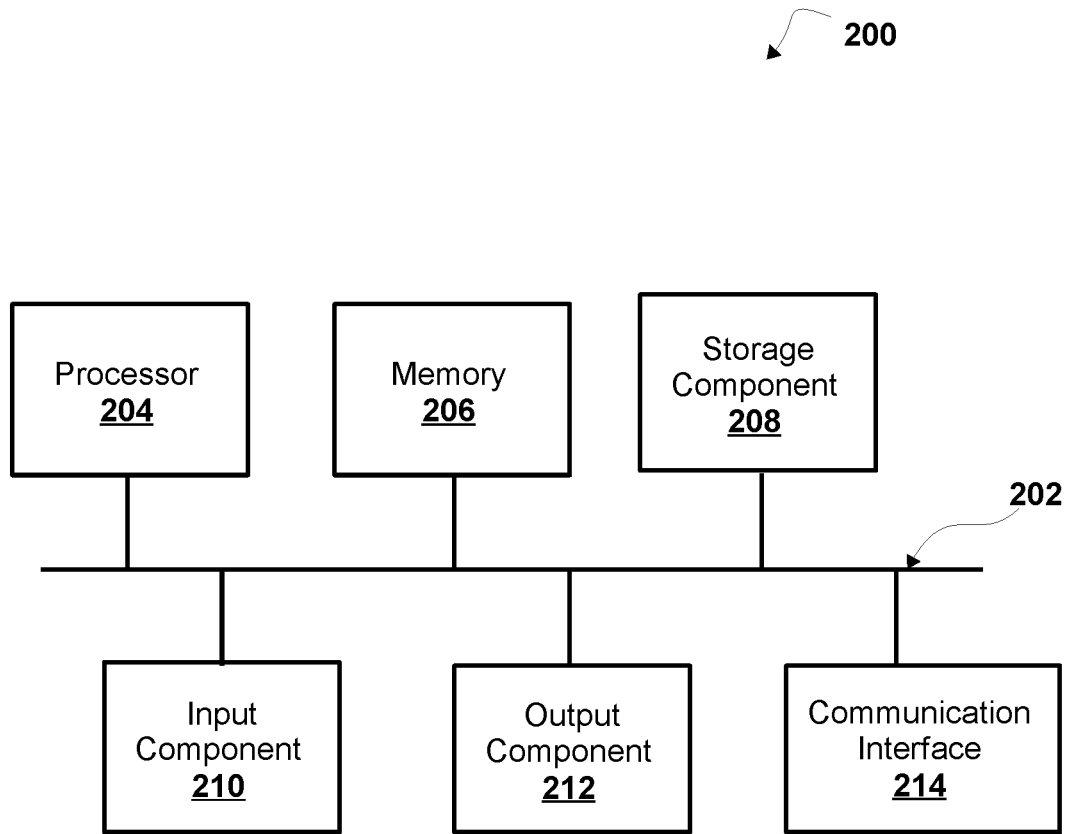
FIG. 2 is a diagram of non-limiting embodiments or aspects of components of one or more devices and/or one or more systems of FIG. 1.

Referring now to FIG. 2, FIG. 2 is a diagram of example components of a device 200. Device 200 may correspond to one or more devices of transaction processing network 101, one or more devices of merchant system 102, one or more devices of payment gateway 104, one or more devices of acquirer system 106, one or more devices of transaction service provider system 108, one or more devices of issuer system 110, user device 112 (e.g., one or more devices of a system of user device 112, etc.), and/or one or more devices of communication network 114. In some non-limiting embodiments or aspects, one or more devices of transaction processing network 101, one or more devices of merchant system 102, one or more devices of payment gateway 104, one or more devices of acquirer system 106, one or more devices of transaction service provider system 108, one or more devices of issuer system 110, user device 112 (e.g., one or more devices of a system of user device 112, etc.), and/or one or more devices of communication network 114 can include at least one device 200 and/or at least one component of device 200. As shown in FIG. 2, device 200 may include a bus 202, a processor 204, memory 206, a storage component 208, an input component 210, an output component 212, and a communication interface 214.

Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208. For example, transaction service provider system 108 may include and/or access one or more internal and/or external databases that store transaction data associated with transactions processed and/or being processed in transaction processing network 101 (e.g., prior or historical transactions processed via transaction service provider system 108, etc.).

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
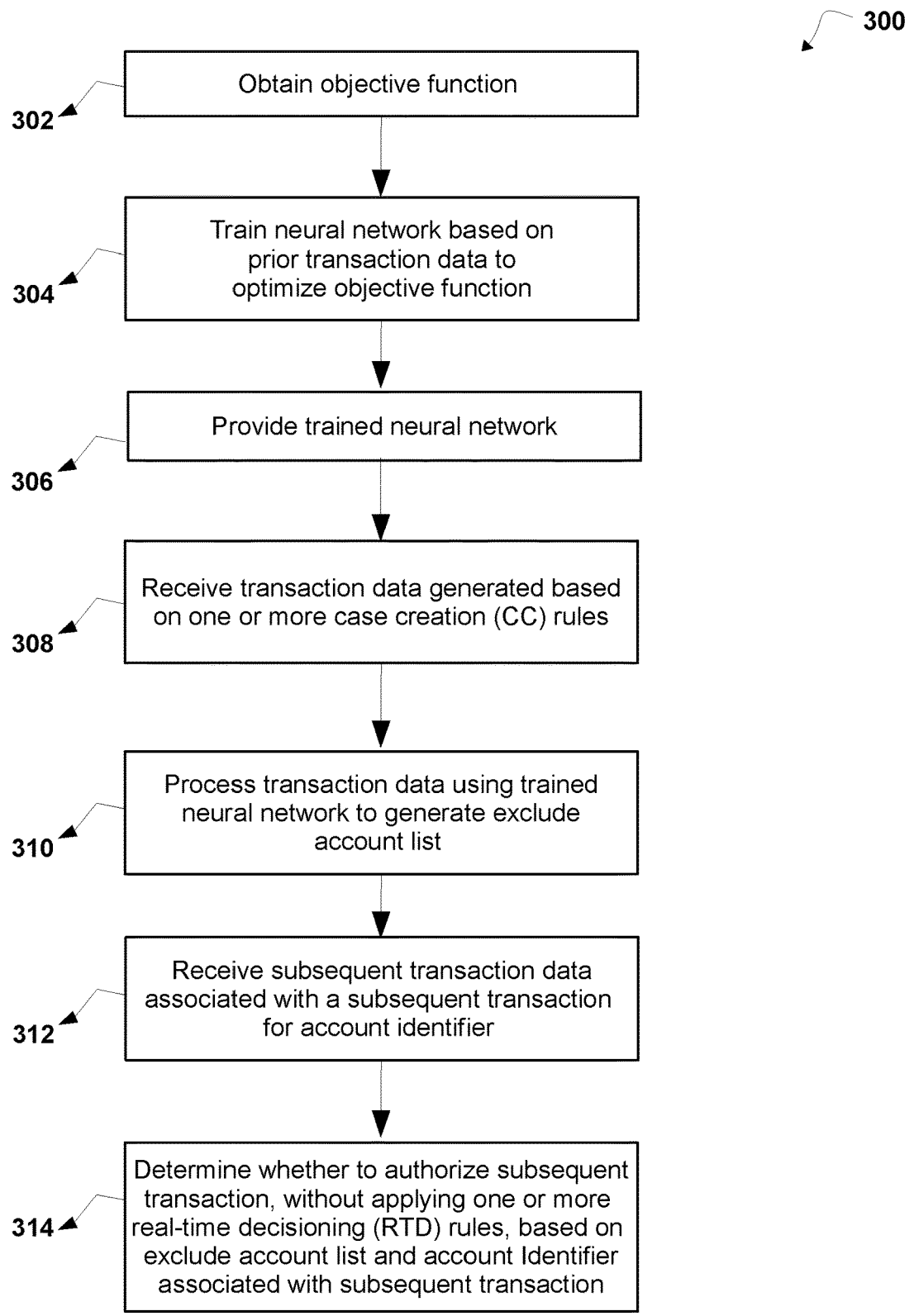
FIG. 3 is a flowchart of non-limiting embodiments or aspects of a process for false decline mitigation.

Referring now to FIG. 3, FIG. 3 is a flowchart of non-limiting embodiments or aspects of a process 300 for false decline mitigation. In some non-limiting embodiments or aspects, one or more of the steps of process 300 may be performed (e.g., completely, partially, etc.) by transaction service provider system 108 (e.g., one or more devices of transaction service provider system 108). In some non-limiting embodiments or aspects, one or more of the steps of process 300 may be performed (e.g., completely, partially, etc.) by another device or a group of devices separate from or including transaction service provider system 108, such as merchant system 102 (e.g., one or more devices of merchant system 102), payment gateway 104 (e.g., one or more devices of payment gateway 104), acquirer system 106 (e.g., one or more devices of acquirer system 106), issuer system 110 (e.g., one or more devices of issuer system 110), and/or user device 112 (e.g., one or more devices of a system of user device 112).

As shown in FIG. 3, at step 302, process 300 includes obtaining an objective function. For example, transaction service provider system 108 may obtain an objective function. As an example, transaction service provider system 108 may obtain an objective function associated with issuer system 110.

In some non-limiting embodiments or aspects, an objective function depends on one or more probabilities of the one or more transactions being falsely declined by one or more RTD rules, one or more amounts of the one or more transactions, and/or the like.

Further details regarding non-limiting embodiments or aspects of step 302 of process 300 are provided below with regard to FIG. 4.

As shown in FIG. 3, at step 304, process 300 includes training a neural network based on prior transaction data to optimize an objective function. For example, transaction service provider system 108 may train a neural network based on prior transaction data to optimize an objective function. As an example, transaction service provider system 108 may train a neural network, based on prior transaction data associated with one or more prior transactions, to optimize the objective function associated with issuer system 110.

In some non-limiting embodiments or aspects, transaction data includes one or more of the following: real-time or current transaction data (e.g., transaction data associated with on-going transactions in transaction processing network 101 that have already been approved by one or more systems in transaction processing network 101, such as, by transaction service provider system 108 applying RTD rules to approve the on-going transactions, etc.); prior or historical transaction data (e.g., transaction data associated with one or more transactions for which an outcome, such as, a false decline, a true decline, a false authorization, and/or a true authorization is known, for example, prior or historical transaction data may be used to simulate application of a model for generating exclude account lists to determine which accounts may be affected by the model, and/or may be used to simulate application of one or more RTD rules to determine which accounts may be affected by the RTD rules, etc.); alert data (e.g., transaction data generated, based on one or more CC rules, during processing of a transaction associated with an account identifier, transaction data generated and received before a transaction associated with an account identifier is determined to be associated with a false decline, authorization data associated with authorization of a transaction before receiving agent action or outcome data associated with the transaction, transaction data for which one or more RTD rules are not applied, such as transaction data based on use of a portable financial device to initiate a transaction, which may have a one to many relationship with an existing transaction, and/or the like, etc.); fraud, agent action, and/or outcome data (e.g., transaction data associated with an indication that a transaction is a fraudulent transaction or a good transaction, which may be generated by issuer system 110 (e.g., an agent of issuer system 110, automatically by issuer system 110, etc.), an indication received from issuer system 110 to place a specific account identifier in an exclude account list, etc.), or any combination thereof.

In some non-limiting embodiments or aspects, issuer system 110 determines whether alert data (e.g., an alert, an alert message, etc.) should be generated for a transaction. For example, issuer system 110 may generate an alert message based on processing a transaction (e.g., in response to a request for authorization of a transaction, etc.) that satisfies one or more CC rules. As an example, issuer system 110 may provide the alert to transaction service provider system 108 in response to generating the alert (e.g., immediately upon generating the alert, during processing of the transaction at issuer system 110, before authorizing or denying the transaction at issuer system 110, with an authorization or denial response associated with the transaction received from issuer system 110, before determining at and/or providing from issuer system 110 fraud, agent action, and/or outcome data associated with the transaction, etc.).

In some non-limiting embodiments or aspects, transaction data may include transaction parameters associated with transactions, such as payment transactions initiated and/or conducted with an electronic wallet application, and/or the like. Non-limiting examples of transaction parameters include: electronic wallet card data, an account identifier (e.g., a primary account number (PAN), etc.), transaction amount, transaction date and time, conversion rate of currency, merchant type, acquiring institution country, PAN country, response code, merchant name/location, type of currency, and/or the like. Response code may refer to a successful approval/completion of a transaction, denial because card reported as lost or stolen, do not honor, partial approval, VIP approval (e.g., VIP program, exclude account list inclusion, etc.), amount exceeds maximum, insufficient funds, incorrect PIN, suspected fraud, activity amount exceeded, allowable number of PIN-entry tries exceeded, and/or the like. In some non-limiting embodiments or aspects, electronic wallet card data includes one or more of data associated with an identifier regarding a portable financial device to be provided to an electronic wallet application, data associated with an identifier of an issuer associated with the portable financial device to be provided to an electronic wallet application, data associated with an identifier of a transaction service provider associated with the portable financial device to be provided to an electronic wallet application, data associated with a name of a user associated with the portable financial device to be provided to an electronic wallet application, data associated with an account identifier of an account associated with the portable financial device to be provided to an electronic wallet application, and/or the like.

In some non-limiting embodiments or aspects, transaction service provider system 108 obtains (e.g., receives, retrieves, accesses, etc.) transaction data from one or more databases and/or from one or more systems of transaction processing network 101. For example, transaction service provider system 108 may obtain transaction data from the one or more databases and/or from the one or more systems of transaction processing network 101 for training a neural network for generating an exclude account list, generating an exclude account list, updating or modifying an exclude account list, processing a transaction by comparing an account identifier associated with the transaction to an exclude account list, providing design feedback data to issuer system 110, and/or the like.

In some non-limiting embodiments or aspects, transaction service provider system 108 generates one or more probabilities associated with whether one or more account identifiers should be added to an exclude account list based on a machine learning technique (e.g., a pattern recognition technique, a data mining technique, a heuristic technique, a supervised learning technique, an unsupervised learning technique, etc.). For example, transaction service provider system 108 generates a neural network model (e.g., an estimator, a classifier, a prediction model, etc.) based on a machine learning algorithm (e.g., a decision tree algorithm, a gradient boosted decision tree algorithm, a random forest algorithm, a neural network algorithm, a convolutional neural network algorithm, etc.). In such an example, transaction service provider system 108 generates the one or more probabilities using the neural network model.

In some non-limiting embodiments or aspects, transaction service provider system 108 generates the neural network model based on prior or historical transaction data associated with one or more prior or historical transactions, to optimize the objective function. For example, the neural network model may be designed to receive, as an input, transaction data associated with a transaction of an account identifier, and provide, as an output, a prediction (e.g., a probability, a binary output, a yes-no output, a score, a prediction score, etc.) as to the transaction of the account identifier being falsely decline (e.g., as to whether to include the account identifier of the transaction on an exclude account list, etc.).

In some non-limiting embodiments or aspects, training the neural network to optimize the objective function includes determining, with the neural network, one or more probabilities of the one or more prior transactions being falsely declined by one or more RTD rules, the objective function being dependent on the one or more probabilities; and modifying, using the objective function, one or more parameters of the neural network. In some non-limiting embodiments or aspects, the objective function is dependent on one or more amounts of the one or more transactions. For example, transaction service provider system 108 may process prior or historical transaction data to obtain training data for the neural network model. For example, transaction service provider system 108 may process the prior or historical transaction data to change the transaction data into a format that is analyzed (e.g., by transaction service provider system 108, etc.) to generate the neural network model. The prior or historical transaction data that is changed may be referred to as training data. As an example, transaction service provider system 108 may process the prior or historical transaction data to obtain the training data based on receiving the prior or historical transaction data. Additionally, or alternatively, transaction service provider system 108 may process the prior or historical transaction data to obtain the training data based on transaction service provider system 108 receiving an indication that transaction service provider system 108 is to process the prior or historical transaction data from a user of transaction service provider system 108 and/or from a user of issuer system 110 (e.g., via the issuer interface described herein, etc.), such as when transaction service provider system 108 receives an indication to create a neural network model for issuer system 110 for generating an exclude account list for false decline mitigation for transactions associated with issuer system 110.

In some non-limiting embodiments or aspects, transaction service provider system 108 processes the prior or historical transaction data by determining one or more false decline variables (and/or true decline variables) based on the prior or historical transaction data. For example, a false decline variable may include a metric, associated with a false decline of a transaction of an account identifier, which is derived based on the prior or historical transaction data (and/or a true decline variable may include a metric, associated with a true decline of a transaction of an account identifier, which is derived based on the prior or historical transaction data). As an example, the false decline variable may be analyzed to generate a model. For example, the false decline variable may include a variable associated with one or more parameters of the prior or historical transaction data. In some non-limiting embodiments or aspects, the false decline variable is a variable associated with a false declined transaction, a true declined transaction, an account identifier, an amount of a transaction, alert data generated, based on one or more CC rules, during processing of a transaction, one or more RTD rules, and/or any other parameter of the transaction data.

In some non-limiting embodiments or aspects, transaction service provider system 108 analyzes the training data to generate a neural network model (e.g., a classifier model, a perdition model, etc.). For example, transaction service provider system 108 uses machine learning techniques to analyze the training data to generate the neural network model. As an example, generating the neural network model (e.g., based on training data, etc.) is referred to as training the neural network model. In such an example, machine learning techniques may include supervised and/or unsupervised techniques, such as decision trees (e.g., gradient boosted decision trees), random forest algorithms, logistic regressions, artificial neural networks (e.g., convolutional neural networks, etc.), Bayesian statistics, learning automata, Hidden Markov Modeling, linear classifiers, quadratic classifiers, association rule learning, and/or the like. In some non-limiting embodiments or aspects, the neural network model includes a classifier model that is specific to a particular issuer system 110, a particular account identifier, a particular group of issuer systems 110, a particular group of account identifiers (e.g., a subset of PANS, a group of PANS included in a particular BIN, etc.), and/or the like.

Additionally, or alternatively, when analyzing the training data, transaction service provider system 108 may identify one or more false decline variables (e.g., one or more independent false decline variables) as predictor variables that are used to make a prediction (e.g., when analyzing the training data, etc.). For example, values of the predictor variables may be inputs to the model. As an example, transaction service provider system 108 may identify a subset (e.g., a proper subset) of false decline variables as predictor variables that are used to accurately predict whether a transaction will be falsely declined. In such an example, the predictor variables may include one or more of the false decline variables, as discussed above, that have a significant impact (e.g., an impact satisfying a threshold, etc.) on a probability of a transaction being a false decline.

In some non-limiting embodiments or aspects, transaction service provider system 108 validates the neural network model by providing validation data associated with one or more prior or historical transactions, and determining, based on an output of the neural network model, whether the neural network model correctly, or incorrectly, predicted a false decline (and/or a true decline, a true authorization, a false authorization, etc.) of the one or more prior or historical transactions. For example, transaction service provider system 108 may validate the neural network model based on a validation threshold (e.g., a threshold value of the validation data, etc.). As an example, transaction service provider system 108 may be programmed and/or configured to validate the model when a false decline (and/or a true decline, a true authorization, a false authorization, etc.) is correctly predicted by the model (e.g., when the prediction model correctly predicts 50% of the validation data, when the prediction model correctly predicts 70% of the validation data, etc.).

In some non-limiting embodiments or aspects, after the neural network model has been validated, transaction service provider system 108 may further train and/or update the neural network model and/or creates new models based on receiving new training data. In some non-limiting embodiments or aspects, the new training data includes transaction data associated with one or more new and/or current transactions and/or one or more subsequent transactions to the one more new and/or current transactions that is different from the prior or historical transactions.

As shown in FIG. 3, at step 306, process 300 includes providing a trained neural network. For example, transaction service provider system 108 may provide a trained neural network. As an example, transaction service provider system 108 may provide the trained neural network. In such an example, transaction service provider system 108 may store the trained neural network model (e.g., store the neural network model for later use, etc.). In some non-limiting embodiments or aspects, transaction service provider system 108 stores the trained neural network model in a data structure (e.g., a database, a linked list, a tree, etc.). In some non-limiting embodiments or aspects, the data structure is located within transaction service provider system 108 and/or external (e.g., remote from) transaction service provider system 108. In some non-limiting embodiments or aspects, transaction service provider system 108 provides the trained neural network model to another system or device of transaction processing network 101, such as issuer system 110, and/or the like.

As shown in FIG. 3, at step 308, process 300 includes receiving transaction data generated based on one or more CC rules. For example, transaction service provider system 108 may receive transaction data generated based on one or more CC rules. As an example, transaction service provider system 108 may receive transaction data (e.g., alert data, an alert, an alert message, etc.) generated, based on one or more CC rules, during processing of a transaction (e.g., in transaction processing network 101, at issuer system 110, etc.) associated with an account identifier. In such an example, the transaction data (e.g., alert data, an alert, an alert message, etc.) generated, based on the one or more CC rules, may be generated (e.g., by issuer system 110, etc.) and/or received (e.g., by transaction service provider system 108, etc.) immediately upon generating the alert, during processing of the transaction at issuer system 110, before authorizing or denying the transaction at issuer system 110, with an authorization or denial response associated with the transaction received from issuer system 110, before determining at issuer system 110 and/or receiving at transaction service provider system 108 fraud, agent action, and/or outcome data associated with the transaction, etc.).

In some non-limiting embodiments or aspects, receiving the transaction data generated, based on the one or more CC rules, further includes receiving fraud, agent action, and/or outcome data associated with the transaction and determining that the transaction associated with the account identifier is associated with a false decline based on the fraud, agent action, and/or outcome data. For example, transaction service provider system 108 may receive the fraud, agent action, and/or outcome data associated with the transaction after authorizing or approving the transaction. As an example, transaction service provider system 108 may receive the fraud, agent action, and/or outcome data associated with the transaction after applying an exclude account list and/or one or more RTD rules to determine whether to approve or deny the transaction.

As shown in FIG. 3, at step 310, process 300 includes processing transaction data using a trained neural network to generate an exclude account list. For example, transaction service provider system 108 may process transaction data using a trained neural network to generate an exclude account list. As an example, transaction service provider system 108 may process, using the trained neural network, the transaction data to generate an exclude account list (e.g., an exclude account list associated with issuer system 110, etc.) including the account identifier associated with the transaction data generated based on one or more CC rules.

In some non-limiting embodiments or aspects, transaction service provider system 108 generates an a priori active exclude account list. For example, transaction service provider system 108 may automatically add an account identifier to an exclude account list in response to the trained neural network determining, based on transaction data associated with one or more transactions of the account identifier, a probability satisfying a probability threshold (e.g., in response to transaction data associated with one or more transactions of the account identifier satisfying the objective function, etc.). As an example, a threshold probability and/or an objective function may result in the account identifier being automatically added to an exclude account list in response to the objective function and/or the threshold probability being satisfied (e.g., in response to a probability of a transaction being a false decline that is greater than 90 percent and/or associated with a cumulative transaction amount that is greater than a predetermined amount, such as $300, etc.).

In some non-limiting embodiments or aspects, transaction service provider system 108 may provide an account identifier to issuer system 110 for review (e.g., via issuer interface, etc.) before adding the account identifier to an exclude account list in response to the trained neural network determining, based on transaction data associated with one or more transactions of the account identifier, a probability that fails to satisfy a probability threshold (e.g., in response to transaction data associated with one or more transactions of the account identifier violating the objective function, etc.). For example, transaction service provider system 108 may add (or decline to add) the account identifier to an exclude account list in response to issuer input received via the issuer interface from issuer system 110. As an example, a threshold probability and/or an objective function may result in the account identifier being provided to issuer system 110 for review in response to the probability of the transaction failing to satisfy the probability threshold (e.g., in response to a probability of a transaction being a false decline that is greater than 30 percent and less than 90 percent and/or associated with a cumulative transaction amount that is greater than a predetermined amount, such as $100, etc.).

In some non-limiting embodiments or aspects, transaction service provider system 108 may not automatically add an account identifier to an exclude account list and may not provide the account identifier to issuer system 110 for review in response to the trained neural network determining, based on transaction data associated with one or more transactions of the account identifier, a probability that fails to satisfy a probability threshold (e.g., in response to a probability of a transaction not being a false decline, such as a probability of the transaction being a false decline that is less than 30 percent, etc.)

Accordingly, prior or historical transaction data can be used to predict whether existing RTD rules may cause false declines, and alert data generated based on a CC rule may be used to predict whether the decline may be a false decline. If a false decline is predicted based on the objective function of issuer system 110, transaction service provider system 108 may pro-actively place an account identifier associated with the transaction predicted to be a false decline on an exclude account list associated with issuer system 110.

As shown in FIG. 3, at step 312, process 300 includes receiving subsequent transaction data associated with a subsequent transaction for an account identifier. For example, transaction service provider system 108 may receive subsequent transaction data associated with a subsequent transaction for an account identifier. As an example, transaction service provider system 108 may receive subsequent transaction data (e.g., a PAN, etc.) associated with a subsequent transaction for the account identifier associated with the transaction data processed, using the trained neural network, to add the account identifier to the exclude account list associated with issuer system 110.

As shown in FIG. 3, at step 314, process 300 includes determining whether to authorize a subsequent transaction, without applying one or more RTD rules, based on an exclude account list and an account identifier associated with the subsequent transaction. For example, transaction service provider system 108 may determine whether to authorize a subsequent transaction, without applying one or more RTD rules, based on an exclude account list and an account identifier associated with the subsequent transaction. As an example, transaction service provider system 108 may determine whether to authorize the subsequent transaction, without applying the one or more RTD rules to the transaction data associated with the subsequent transaction to determine whether to approve or decline the subsequent transaction, based on the exclude account list associated with issuer system 110 and the account identifier associated with the subsequent transaction.

Figure 4:
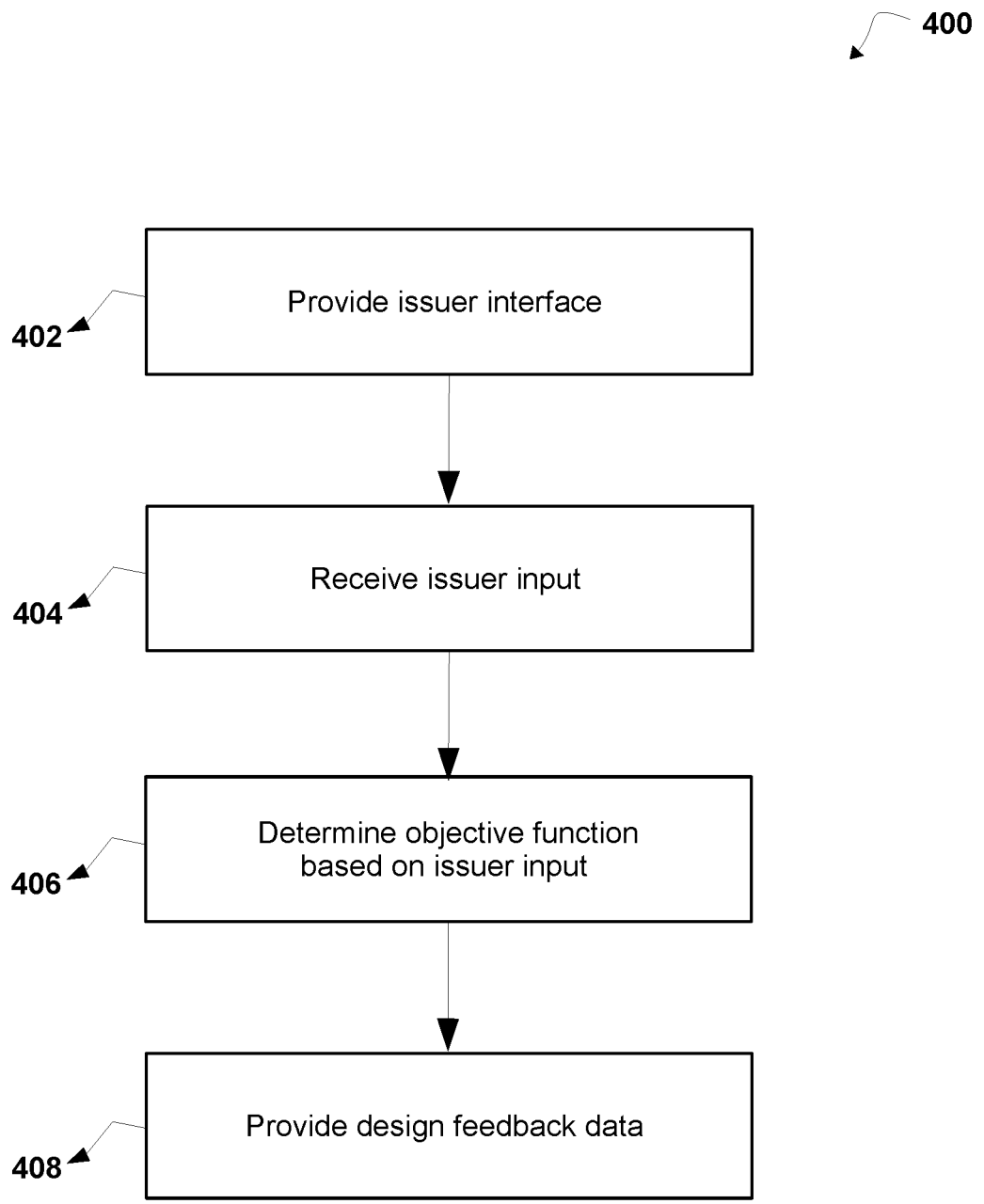
FIG. 4 is a flowchart of non-limiting embodiments or aspects of a process for false decline mitigation.

Referring now to FIG. 4, FIG. 4 is a flowchart of non-limiting embodiments or aspects of a process 400 for false decline mitigation. In some non-limiting embodiments or aspects, one or more of the steps of process 400 may be performed (e.g., completely, partially, etc.) by transaction service provider system 108 (e.g., one or more devices of transaction service provider system 108). In some non-limiting embodiments or aspects, one or more of the steps of process 400 may be performed (e.g., completely, partially, etc.) by another device or a group of devices separate from or including transaction service provider system 108, such as merchant system 102 (e.g., one or more devices of merchant system 102), payment gateway 104 (e.g., one or more devices of payment gateway 104), acquirer system 106 (e.g., one or more devices of acquirer system 106), issuer system 110 (e.g., one or more devices of issuer system 110), and/or user device 112 (e.g., one or more devices of a system of user device 112).

As shown in FIG. 4, at step 402, process 400 includes providing an issuer interface. For example, transaction service provider system 108 may provide an issuer interface. As an example, transaction service provider system 108 may provide an issuer interface to issuer system 110. In such an example, the issuer interface may be programmed and/or configured to receive issuer input from issuer system 110 (e.g., via input component 210, communication interface 214, etc.) and/or provide information and/or data to issuer system 110 (e.g., via output component 212, communication interface 214, etc.).

As shown in FIG. 4, at step 404, process 400 includes receiving issuer input. For example, transaction service provider system 108 may receive issuer input. As an example, transaction service provider system 108 may receive, via the issuer interface from issuer system 110, issuer input.

In some non-limiting embodiments or aspects, transaction service provider system 108 may provide a plurality of different objective functions and/or probability thresholds via the user interface to issuer system 110. In some non-limiting embodiments or aspects, transaction service provider system 108 may provide options via the user interface for identifying or selecting one or more neural network models, one or more parameters of one or more neural network models, an objective function, one or more parameters of an objective function, a desired number of false declines, a desired number of true declines, and/or the like.

As shown in FIG. 4, at step 406, process 400 includes determining an objective function based on issuer input. For example, transaction service provider system 108 may determine an objective function based on issuer input. As an example, transaction service provider system 108 may determine the objective function based on the issuer input received from issuer system 110 via the issuer interface.

In some non-limiting embodiments or aspects, transaction service provider system 108 may receive issuer input identifying or selecting a particular objective function of the plurality of different objective functions (and/or a particular probability threshold of a plurality of different probability thresholds) for use in training and/or using a neural network for generating an exclude account list for issuer system 110. In some non-limiting embodiments or aspects, transaction service provider system 108 may receive issuer input associated with one or more neural network models, one or more parameters of one or more neural network models, an objective function, one or more parameters of an objective function, a desired number of false declines, a desired number of true declines, and/or the like and determine a particular objective function of the plurality of different objective functions for use in training and/or using a neural network for generating an exclude account list with a neural network for issuer system 110 based on the issuer input (e.g., according to one or more algorithms for optimizing parameters to achieve optimal false declines and/or optimal true declines, etc.).

As shown in FIG. 4, at step 408, process 400 includes providing design feedback data. For example, transaction service provider system 108 may provide design feedback data. As an example, transaction service provider system 108 may provide, via the issuer interface to issuer system 110, design feedback data associated with at least one of a number of false declined transactions, a number of true decline transactions, a number of true authorized transactions, a number of false authorized transactions, or any combination thereof associated with issuer system 110.

In some non-limiting embodiments or aspects, transaction service provider system 108 may receive the issuer input in response to providing the design feedback to issuer system 110 via the issuer interface. For example, an issuer may provide user input associated with and/or selecting one or more neural network models, one or more parameters of one or more neural network models, an objective function, one or more parameters of an objective function, a desired number of false declines, a desired number of true declines, and/or the like via the user interface, and transaction service provider system 108 may implement a neural network model, one or more parameters thereof, and/or an objective function thereof for use in training and/or using an exclude account list according to the issuer input. As an example, and as described in more detail herein, transaction service provider system 108 may train a neural network model to optimize the objective function based on prior or historical transaction data (e.g., declines, approves, etc.), alert data (e.g., transaction data generated, based on one or more CC rules, during processing of a transaction associated with an account identifier, etc.), fraud, agent action, or outcome data associated with results of transaction at an account identifier level, and/or the like.

Further details regarding non-limiting embodiments or aspects of step 314 of process 300 are provided below with regard to FIG. 5.

Figure 5:
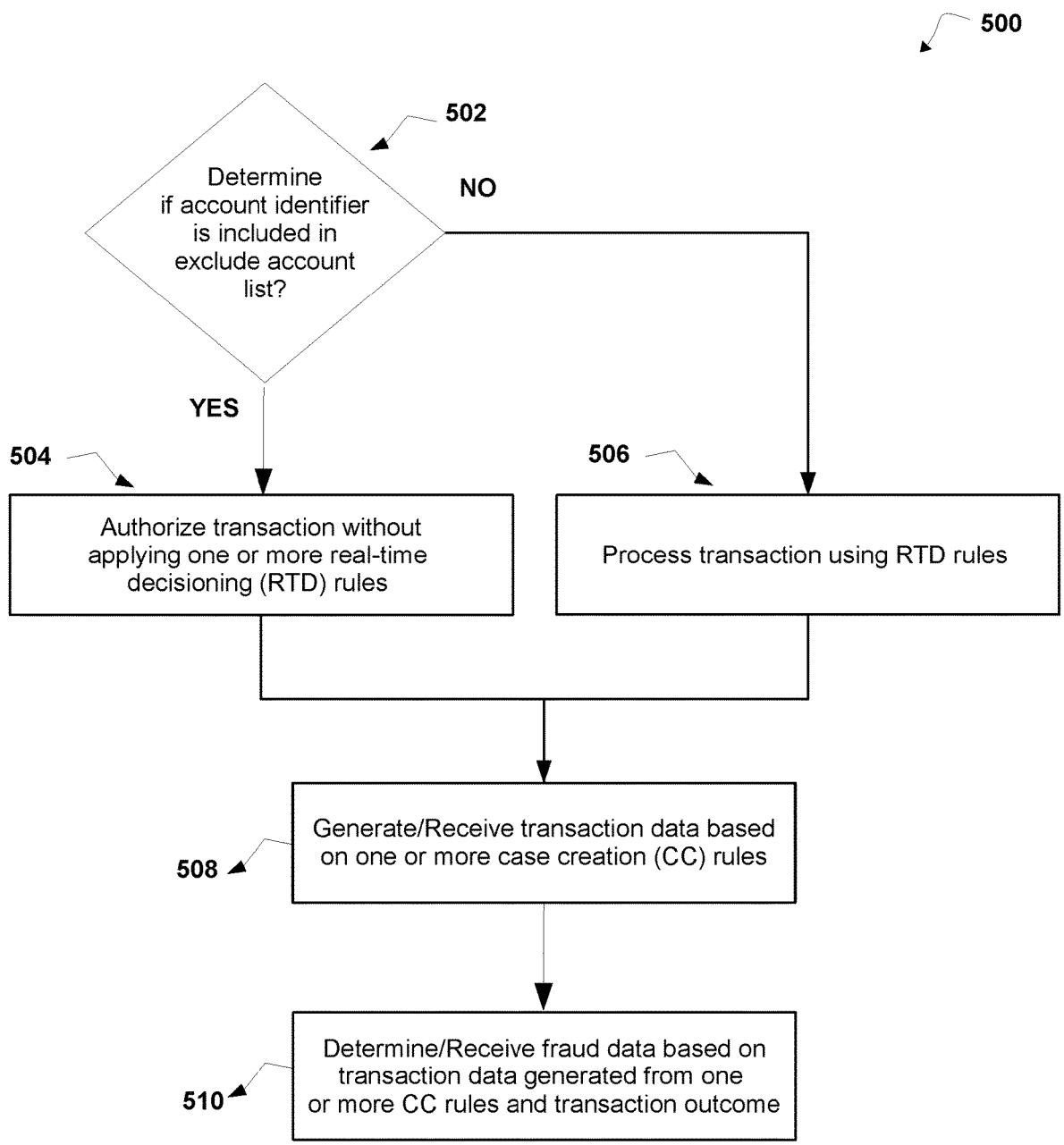
FIG. 5 is a flowchart of non-limiting embodiments or aspects of a process for false decline mitigation.

Referring now to FIG. 5, FIG. 5 is a flowchart of non-limiting embodiments or aspects of a process 500 for false decline mitigation. In some non-limiting embodiments or aspects, one or more of the steps of process 500 may be performed (e.g., completely, partially, etc.) by transaction service provider system 108 (e.g., one or more devices of transaction service provider system 108). In some non-limiting embodiments or aspects, one or more of the steps of process 500 may be performed (e.g., completely, partially, etc.) by another device or a group of devices separate from or including transaction service provider system 108, such as merchant system 102 (e.g., one or more devices of merchant system 102), payment gateway 104 (e.g., one or more devices of payment gateway 104), acquirer system 106 (e.g., one or more devices of acquirer system 106), issuer system 110 (e.g., one or more devices of issuer system 110), and/or user device 112 (e.g., one or more devices of a system of user device 112).

As shown in FIG. 5, at step 502, process 500 includes determining if an account identifier is included in an exclude account list. For example, transaction service provider system 108 may determine if an account identifier is included in an exclude account list. As an example, transaction service provider system 108 may determine if the account identifier associated with the subsequent transaction is included in the exclude account list associated with issuer system 110. In such an example, transaction service provider system 108 may compare the account identifier associated with the subsequent transaction to account identifiers included in the exclude account list associated with issuer system 110 to determine whether the account identifier is included in the exclude account list.

As shown in FIG. 5, at step 504, process 500 includes, in response to determining that an account identifier is included in an exclude account list, authorizing a transaction without applying one or more RTD rules. For example, transaction service provider system 108 may, in response to determining that an account identifier is included in an exclude account list, authorize a transaction without applying one or more RTD rules. As an example, transaction service provider system 108 may, in response to determining that the account identifier associated with the subsequent transaction is included in the exclude account list associated with issuer system 110, authorize the transaction without applying the one or more RTD rules to the subsequent transaction. In such an example, transaction service provider system 108 may authorize (e.g., automatically authorize, etc.), based on the exclude account list associated with issuer system 110 and the account identifier associated with the subsequent transaction, the subsequent transaction associated with the account identifier without applying one or more RTD rules (e.g., without applying RTD rules created and/or validated by rule validator 720, etc.) to the subsequent transaction. As an example, the subsequent transaction associated with the account identifier may be authorized, based on the exclude account list and the account identifier, without applying the one or more RTD rules to the transaction, before receiving the fraud, agent action, or outcome data associated with the transaction for the account identifier that caused transaction service provider system 108 to generate (e.g., create, update, modify, etc.) the exclude account list including the account identifier. In such an example, the one or more RTD rules may be applied to the transaction associated with the account identifier that is processed using the trained neural network (e.g., to the transaction associated with the account identifier that is processed in transaction processing network 101 before (e.g., immediately before, etc.) the subsequent transaction, etc.).

As shown in FIG. 5, at step 506, process 500 includes, in response to determining that an account identifier is not included in an exclude account list, processing a transaction using one or more RTD rules. For example, transaction service provider system 108 may, in response to determining that an account identifier is not included in an exclude account list, process a transaction using one or more RTD rules. As an example, transaction service provider system 108 may, in response to determining that the account identifier is not included in the exclude account list, process the transaction using one or more RTD rules. In such an example, transaction service provider system 108 may, in response to determining that the account identifier is not included in the exclude account list, process the transaction associated with the account identifier that is processed in transaction processing network 101 before (e.g., immediately before, etc.) the subsequent transaction using the one or more RTD rules (e.g., by applying RTD rules created and/or validated by rule validator 720, etc.).

As shown in FIG. 5, at step 508, process 500 includes generating and/or receiving transaction data based on one or more CC rules. For example, transaction service provider system 108 may generate transaction data (e.g., alert data, etc.) based on one or more CC rules. As an example, transaction service provider system 108 may generate the transaction data associated with the transaction for the account identifier that is processed in transaction processing network 101 before the subsequent transaction based on the one or more CC rules. Additionally, or alternatively, issuer system 110 may generate the transaction data based on the one or more CC rules. For example, transaction service provider system 108 may receive the transaction data (e.g., alert data, etc.) generated based on the one or more CC rules from issuer system 110.

As shown in FIG. 5, at step 510, process 500 includes determining and/or receiving fraud, agent action, and/or outcome data based on transaction data generated from one or more CC rules and a transaction outcome. For example, transaction service provider system 108 may determine fraud, agent action, and/or outcome data based on transaction data generated based on the one or more CC rules and a transaction outcome. As an example, transaction service provider system 108 may determine fraud, agent action, and/or outcome data based on the transaction data associated with the transaction for the account identifier that is processed in transaction processing network 101 before the subsequent transaction based on the transaction data generated from the one or more CC rules being applied to the transaction and a transaction outcome (e.g., a false decline, a true decline, a false authorization, a true authorization, etc.) of the transaction. Additionally, or alternatively, issuer system 110 may determine the fraud, agent action, and/or outcome data based on the one or more CC rules and a transaction outcome. For example, transaction service provider system 108 may receive the fraud, agent action, and/or outcome data (e.g., an indication of a false decline, an indication of a true decline, an indication of a false authorization, an indication of a true authorization, etc.) from issuer system 110.

Referring also to FIG. 6, FIG. 6 is a diagram of non-limiting embodiments or aspects of an implementation 600 of an RTD rule. For example, an RTD rule may include one or more criteria (e.g., a set of business rules, a time period, a program, a type of portable financial device, a BIN of the issuer, a group of BINs (BID) of the issuer, etc.). As an example, the implementation 600 of an RTD rule shown in FIG. 6 includes two criteria, which may be search conditions or filters applied to determine whether to authorize/approve or decline/deny a transaction: (i) panFirstDigits BETWEEN 433430000 and 433439999 and (ii) digCommind NOTIN 1. In such an example, panFirstDigits and digCommind may be fields or parameters in the transaction data associated with a transaction and, if each of the criteria are satisfied, the RTD rule may cause transaction processing network 101 (e.g., one or more systems of transaction processing network 101, such as transaction service provider system 108, issuer system 110, and/or the like, etc.) to decline or deny the transaction. For example, RTD rules may include relatively simple criteria or conditions on various data fields in transaction data that can be applied to approve or decline a transaction associated with the transaction data, and multiple conditions may be connected with operators, such as AND, OR, and/or the like (e.g., transactionAmt GREATER-THAN 3000 AND merchantLocation EQUALS "Moscow", etc.).

Figure 7:
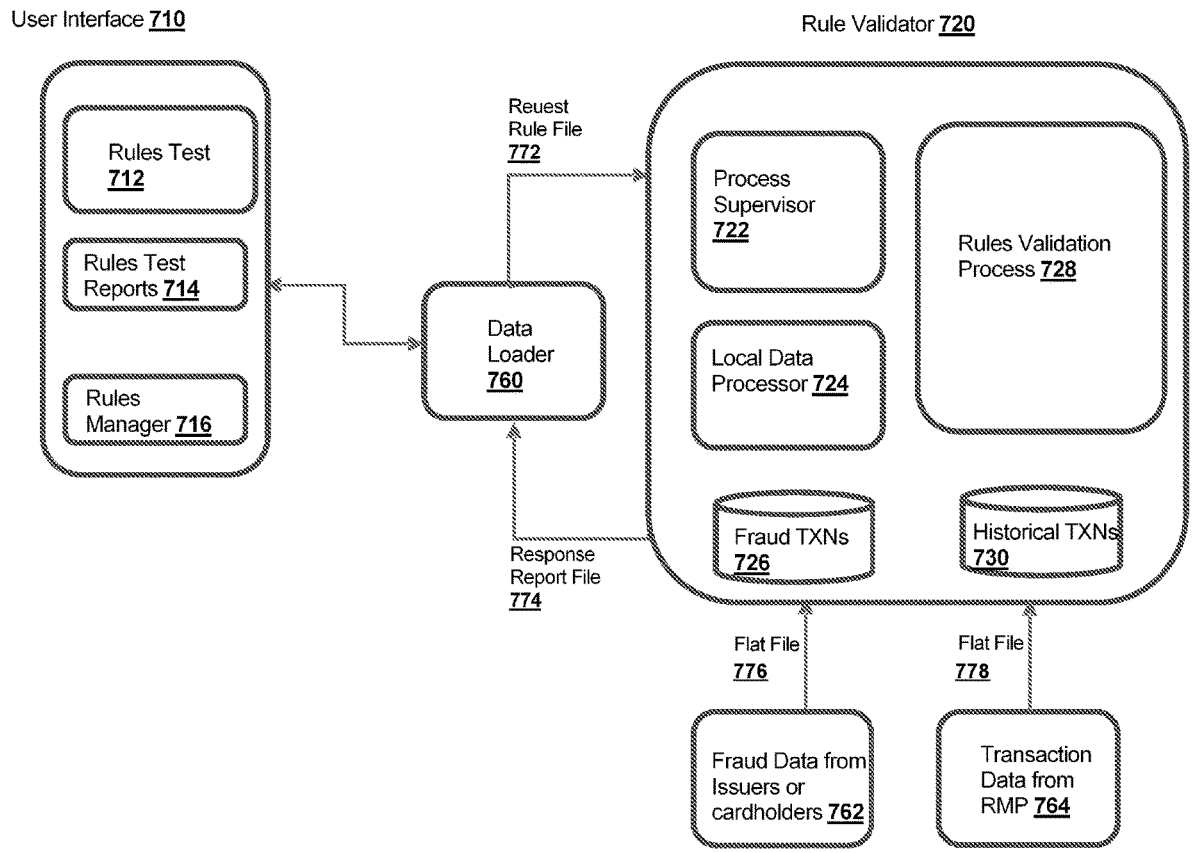
FIG. 7 is a diagram of non-limiting embodiments or aspects of an implementation of an RTD rule creation and validation architecture.

Referring also to FIG. 7, FIG. 7 is a diagram of non-limiting embodiments or aspects of an implementation 700 of an RTD rule creation and validation architecture. As shown in FIG. 7, an issuer (e.g., issuer system 110, etc.) may connect to rule validator 720 via a user interface 710. User interface 710 and/or rule validator 720 may be implemented in hardware, software, or a combination of hardware and software. User interface 710 may include a module, process, and/or application programming interface (API) for a rules test module 712, a module, process, and/or API for a rules test reports module 714, and/or a module, process, and/or API for a rules manager 716. For example, a human agent of an issuer may create rules with rules manager 716 and submit a set of rules to rule validator 720 for validation via rules test module 712. As an example, results of rule validation may be made available to the issuer via rules test reports module 714.

Still referring to FIG. 7, user interface 710 may communicate with rule validator 720 via a data loader module 760. For example, data loader module 760 submits user requested rule file 772 to rule validator 720 and receives response report file 774 from rule validator 720. As an example, fraud data may be submitted by issuers and/or cardholders/account holders through an independent process 762 in a form of a flat file 776, which may be stored in a fraud transactions (TXNs) database 726 of rule validator 720. In such an example, rule validator 720 may obtain transaction data from an independent risk management plan (RMP) module or process 764.

Rule validator 720 may include a module, process, and/or application programming interface (API) for a process supervisor 722, a module, process, and/or application programming interface (API) for a local data processor 724, a module, process, and/or application programming interface (API) for the fraud TXNs database 726, a module, process, and/or application programming interface (API) for a rules validation process 728, and/or a module, process, and/or application programming interface (API) for the historical transaction (TXNs) database 730. For example, process supervisor 722 may co-ordinate various processes of rule validator 720. As an example, local data processor 724 may be responsible for in-memory data processing. In such an example, rules validation process 728 may read fraudulent transactions from fraud TXNs database 726 and historical transaction data from historical transaction (TXNs) database 730 and perform rules validation using local data processor 728 based on the fraudulent transactions and the historical transactions. For example, rule validator 720 may store results of a rules validation in fraud TXNs database 726 and/or provide the results in response report file 774 to user interface 710.

In some non-limiting embodiments or aspects, transaction service provider system 108 authorizes, based on an exclude account list and an account identifier, a transaction associated with the account identifier without applying one or more RTD rules (e.g., without applying RTD rules created and/or validated by rule validator 720, etc.) to the transaction.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, many of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method for false decline mitigation, comprising:
    providing, with at least one processor of a transaction service provider system, an issuer interface to an issuer system, wherein the issuer interface provides options for selecting a neural network of a plurality of neural networks, one or more parameters of the neural network, an objective function of a plurality of objective functions, one or more parameters of the objective function, a desired number of false declines, and a desired number of true declines;
    receiving, with the at least one processor of the transaction service provider system, via the issuer interface from the issuer system, issuer input, wherein the issuer input identifies or selects the neural network of the plurality of neural networks, the one or more parameters of the neural network, the objective function of the plurality of objective functions, the one or more parameters of the objective function, the desired number of false declines, and the desired number of true declines; and
    determining, with the at least one processor of the transaction service provider system, an objective function associated with the issuer system based on the issuer input;
    training, with the at least one processor of the transaction service provider system, the neural network, based on prior transaction data associated with one or more prior transactions, to optimize the objective function, wherein the objective function depends on one or more probabilities of the one or more prior transactions being falsely declined by one or more real-time decisioning (RTD) rules;
    providing, with the at least one processor of the transaction service provider system, the trained neural network;
    receiving, with the at least one processor of the transaction service provider system, transaction data associated with a transaction associated with an account identifier;
    in response to determining that the account identifier is not included in an exclude from RTD account list of accounts for which transactions are automatically authorized without applying the one or more RTD rules to the transactions, processing, with the at least one processor of the transaction service provider system, the transaction using the one or more RTD rules;
    receiving, with the at least one processor of the transaction service provider system, from the issuer system, before or with receipt of an authorization or denial response associated with the transaction from the issuer system, alert data generated by the issuer system in response to the issuer system determining that the transaction satisfies one or more case creation (CC) rules, wherein the one or more CC rules create a case associated with the transaction at the issuer system, and wherein the transaction service provider system receives the alert data from the issuer system before the case created by the one or more CC rules is resolved at the issuer system to provide a case creation transaction outcome indicating that the transaction was one of a false decline, a true decline, a false authorization, and a true authorization;
    processing, with the at least one processor of the transaction service provider system, before the case created by the one or more CC rules is resolved at the issuer system to provide the case creation transaction outcome indicating that the transaction was one of a false decline, a true decline, a false authorization, and a true authorization and before a subsequent transaction associated with the account identifier is initiated, using the trained neural network, the alert data to update the exclude from RTD account list to include the account identifier, wherein the updating of the exclude from RTD account list uses a separate and different logic than a logic for modifying the one or more RTD rules;
    receiving, with the at least one processor of the transaction service provider system, subsequent transaction data associated with the subsequent transaction associated with the account identifier; and
    in response to determining that the account identifier is included in the exclude from RTD account list, authorizing, with the at least one processor of the transaction service provider system, the subsequent transaction for the account identifier without applying the one or more RTD rules to the subsequent transaction, wherein the subsequent transaction is authorized before receiving, from the issuer system, the case creation transaction outcome indicating that the transaction was one of a false decline, a true decline, a false authorization, and a true authorization.

2. The computer-implemented method of claim 1, wherein training the neural network to optimize the objective function further comprises:
    determining, with the neural network, the one or more probabilities of the one or more prior transactions being falsely declined by the one or more RTD rules; and
    modifying, using the objective function, one or more parameters of the neural network.

3. The computer-implemented method of claim 2, wherein the objective function further depends on one or more amounts of the one or more transactions.

4. The computer-implemented method of claim 1, further comprising:
    providing, with the at least one processor of the transaction service provider system, via the issuer interface to the issuer system, design feedback data associated with at least one of a number of false declined transactions and a number of true decline transactions for the issuer system.

5. The computer-implemented method of claim 1, further comprising:

after authorizing the subsequent transaction without applying the one or more RTD rules to the subsequent transaction, receiving, with the at least one processor of the transaction service provider system, from the issuer system, the transaction outcome.

6. The computer-implemented method of claim 1, further comprising:
providing, with the at least one processor of the transaction service provider system, a user interface that communicates with a rule validator module via a data loader module;
submitting, with the at least one processor of the transaction service provider system, using the data loader module, a user requested rule file to the rule validator module; and
receiving, with the at least one processor of the transaction service provider system, using the data loader module, a response report file from the rule validator module, wherein the rule validator module stores fraud data submitted by issuers and/or account holders through an independent process in a form of a flat file in a fraud transactions (TXNs) database of the rule validator module, wherein the rule validator module further stores historical transaction data from an independent risk management plan (RMP) module in a historical TXNs database of the rule validator module, wherein the rule validator module further includes a process supervisor module, a local data processor module, and a rules validation process module, and wherein the rules validation process module reads fraudulent transactions from the fraud TXNs database and historical transactions from the historical TXNs database and performs rules validation in-memory using the local data processor module based on the fraudulent transactions and the historical transactions to provide the results in the response report file.

7. A computing system for false decline mitigation, comprising:
one or more processors of a transaction service provider system programmed and/or configured to:
provide an issuer interface to an issuer system, wherein the issuer interface provides options for selecting a neural network of a plurality of neural networks, one or more parameters of the neural network, an objective function of a plurality of objective functions, one or more parameters of the objective function, a desired number of false declines, and a desired number of true declines;
receive, via the issuer interface from the issuer system, issuer input. wherein the issuer input identifies or selects the neural network of the plurality of neural networks, the one or more parameters of the neural network, the objective function of the plurality of objective functions, the one or more parameters of the objective function, the desired number of false declines, and the desired number of true declines; and
determine an objective function associated with the issuer system based on the issuer input;
train the neural network, based on prior transaction data associated with one or more prior transactions, to optimize the objective function, wherein the objective function depends on one or more probabilities of the one or more prior transactions being falsely declined by one or more real-time decisioning (RTD) rules;
provide the trained neural network;
receive transaction data associated with a transaction associated with an account identifier;
in response to determining that the account identifier is not included in an exclude from RTD account list of accounts for which transactions are automatically authorized without applying the one or more RTD rules to the transactions, process the transaction using the one or more RTD rules;
receive, from the issuer system, before or with receipt of an authorization or denial response associated with the transaction from the issuer system, alert data generated by the issuer system in response to the issuer system determining that the transaction satisfies one or more case creation (CC) rules, wherein the one or more CC rules create a case associated with the transaction at the issuer system, and wherein the transaction service provider system receives the alert data from the issuer system before the case created by the one or more CC rules is resolved at the issuer system to provide a case creation transaction outcome indicating that the transaction was one of a false decline, a true decline, a false authorization, and a true authorization;
process, before the case created by the one or more CC rules is resolved at the issuer system to provide the case creation transaction outcome indicating that the transaction was one of a false decline, a true decline, a false authorization, and a true authorization and before a subsequent transaction associated with the account identifier is initiated, using the trained neural network, the alert data to update the exclude from RTD account list to include the account identifier, wherein the updating of the exclude from RTD account list uses a separate and different logic than a logic for modifying the one or more RTD rules;
receive subsequent transaction data associated with the subsequent transaction for the account identifier; and
in response to determining that the account identifier is included in the exclude from RTD account list, authorize the subsequent transaction for the account identifier without applying the one or more RTD rules to the subsequent transaction, wherein the subsequent transaction is authorized before receiving, from the issuer system, the case creation transaction outcome indicating that the transaction was one of a false decline, a true decline, a false authorization, and a true authorization.

8. The computing system of claim 7, wherein the one or more processors of the transaction service provider system train the neural network to optimize the objective function by:
determining, with the neural network, one or more probabilities of the one or more prior transactions being falsely declined by the one or more RTD rules; and
modifying, using the objective function, one or more parameters of the neural network.

9. The computing system of claim 8, wherein the objective function further depends on one or more amounts of the one or more transactions.

10. The computing system of claim 7, wherein the one or more processors of the transaction service provider system are further programmed and/or configured to:
provide, via the issuer interface to the issuer system, design feedback data associated with at least one of a number of false declined transactions and a number of true decline transactions for the issuer system.

11. The computing system of claim 7, wherein the one or more processors of the transaction service provider system are further programmed and/or configured to:

after authorizing the subsequent transaction without applying the one or more RTD rules to the subsequent transaction, receive, from the issuer system, the transaction outcome.

12. A computer program product comprising at least one non-transitory computer-readable medium including program instructions for false decline mitigation that, when executed by at least one processor of a transaction service provider system, cause the at least one processor of the transaction service provider system to:

provide an issuer interface to an issuer system, wherein the issuer interface provides options for selecting a neural network of a plurality of neural networks, one or more parameters of the neural network, an objective function of a plurality of objective functions, one or more parameters of the objective function, a desired number of false declines, and a desired number of true declines;

receive, via the issuer interface from the issuer system, issuer input, wherein the issuer input identifies or selects the neural network of the plurality of neural networks, the one or more parameters of the neural network, the objective function of the plurality of objective functions, the one or more parameters of the objective function, the desired number of false declines, and the desired number of true declines; and determine an objective function associated with the issuer system based on the issuer input;

train the neural network, based on prior transaction data associated with one or more prior transactions, to optimize the objective function, wherein the objective function depends on one or more probabilities of the one or more prior transactions being falsely declined by one or more real-time decisioning (RTD) rules;

provide the trained neural network;

receive transaction data associated with a transaction associated with an account identifier;

in response to determining that the account identifier is not included in an exclude from RTD account list of accounts for which transactions are automatically authorized without applying the one or more RTD rules to the transaction, process the transaction using the one or more RTD rules;

receive, from the issuer system, before or with receipt of an authorization or denial response associated with the transaction from the issuer system, alert data generated by the issuer system in response to the issuer system determining that the transaction satisfies one or more case creation (CC) rules, wherein the one or more CC rules create a case associated with the transaction at the issuer system, and wherein the transaction service provider system receives the alert data from the issuer system before the case created by the one or more CC rules is resolved at the issuer system to provide a case creation transaction outcome indicating that the transaction was one of a false decline, a true decline, a false authorization, and a true authorization;

process, before the case created by the one or more CC rules is resolved at the issuer system to provide the case creation transaction outcome indicating that the transaction was one of a false decline, a true decline, a false authorization, and a true authorization and before a subsequent transaction associated with the account identifier is initiated, using the trained neural network, the alert data to update the exclude from RTD account list to include the account identifier, wherein the updating of the exclude from RTD account list uses a separate and different logic than a logic for modifying the one or more RTD rules;

receive subsequent transaction data associated with the subsequent transaction for the account identifier; and in response to determining that the account identifier is included in the exclude from RTD account list, authorize the subsequent transaction for the account identifier without applying the one or more RTD rules to the subsequent transaction, wherein the subsequent transaction is authorized before receiving, from the issuer system, the case creation transaction outcome indicating that the transaction was one of a false decline, a true decline, a false authorization, and a true authorization.

13. The computer program product of claim 12, wherein the instructions, when executed by the at least one processor of the transaction service provider system, further cause the at least one processor of the transaction service provider system to train the neural network to optimize the objective function by:

determining, with the neural network, one or more probabilities of the one or more prior transactions being falsely declined by the one or more RTD rules; and modifying, using the objective function, one or more parameters of the neural network.

14. The computer program product of claim 13, wherein the objective function further depends on one or more amounts of the one or more transactions.

15. The computer program product of claim 12, wherein the instructions, when executed by the at least one processor of the transaction service provider system, further cause the at least one processor of the transaction service provider system to:

provide, via the issuer interface to the issuer system, design feedback data associated with at least one of a number of false declined transactions and a number of true decline transactions for the issuer system.

16. The computer program product of claim 12, wherein the instructions, when executed by the at least one processor of the transaction service provider system, further cause the at least one processor of the transaction service provider system to:

after authorizing the subsequent transaction without applying the one or more RTD rules to the subsequent transaction, receive, from the issuer system, the transaction outcome.

* * * * *